United States Patent
Sassaman, Jr. et al.

(10) Patent No.: US 6,315,906 B1
(45) Date of Patent: *Nov. 13, 2001

(54) REMOVING METAL IONS FROM WASTEWATER

(75) Inventors: Frank L. Sassaman, Jr., Franklin Township; James L. Filson, Wexford; Philip M. Kemp, Jefferson Township, all of PA (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/113,981

(22) Filed: Jul. 10, 1998

(51) Int. Cl.⁷ .................................. C02F 9/00
(52) U.S. Cl. ................ 210/666; 210/667; 210/912
(58) Field of Search .................... 210/666, 667, 210/668, 688, 202, 912

(56) References Cited

U.S. PATENT DOCUMENTS

| | | | |
|---|---|---|---|
| 2,271,482 | 1/1942 | Hoelkeskamp et al. | 23/55 |
| 3,301,542 | 1/1967 | Medford, Jr. et al. | 266/12 |
| 3,428,449 | 2/1969 | Swanson | 75/117 |
| 3,440,036 | 4/1969 | Spinney | 75/117 |
| 3,658,697 | 4/1972 | Huether | 210/18 |
| 3,873,581 | 3/1975 | Fitzpatrick et al. | 260/370 |
| 3,912,801 | 10/1975 | Stephens | 423/8 |
| 3,914,374 | 10/1975 | Koehler et al. | 423/25 |
| 3,923,741 | 12/1975 | Asano et al. | 260/561 N |
| 3,941,837 | 3/1976 | Asano et al. | 260/561 N |
| 3,959,129 | 5/1976 | White et al. | 210/28 |
| 4,010,099 | 3/1977 | Leach et al. | 210/21 |
| 4,070,281 * | 1/1978 | Tagashira et al. | 210/664 |
| 4,210,530 | 7/1980 | Etzel et al. | 210/38 B |
| 4,231,888 | 11/1980 | Dalton | 252/182 |
| 4,329,210 | 5/1982 | Merchant et al. | 204/107 |
| 4,569,769 | 2/1986 | Walton et al. | 210/759 |
| 4,629,570 | 12/1986 | Kennedy, Jr. | 210/666 |

(List continued on next page.)

FOREIGN PATENT DOCUMENTS 0761603    12/1997   (EP) .

OTHER PUBLICATIONS

O'Mara & Associates, Section 4 –IC Planarization by Chemical Mechanical Polishing, pp. 4–32 to 4–34.

"Treatment and Water Recycling of Copper CMP Slurry Waste Streams to Achieve Environmental Compliance for Copper and Suspended Solids", Mary Reker et al., *Semiconductor Fabtech—8th Edition*, (8 pages total).

"Manufacturability of the CMP Process", Farid Malik et al., *Thin Solid Films 270* (1995), pp. 612–615.

Rohm and Haas, "Helpful Hints in Ion Exchange Technology", Robert Kunin, Sep. 1981, IE–73–63–74, (8 pages total).

"Industrial Wastewater Treatment by Granular Activated Carbon", Donald G. Hager, *Industrial Water Engineering*, Jan./Feb. 1974, pp. 14–28.

Lewatit® –"The Use of Ion Exchange for the Polishing of Water", F. Martinola et al., Bayer, Paper given at the VGB conference in Essen, Oct. 1985, (43 pages total).

*Primary Examiner*—Ivars Cintins
(74) *Attorney, Agent, or Firm*—Douglas G. Glantz

(57) ABSTRACT

A novel process and apparatus are disclosed for cleaning wastewater containing metal ions in solution, hydrogen peroxide, and high solids, e.g., greater than about 50 mg/l particulate solids. A carbon adsorption column removes hydrogen peroxide in the wastewater feed containing high solids. A chemical precipitation unit removes the metal ions from solution. The process and apparatus remove metal ions such as copper from a high solids byproduct polishing slurry from the chemical mechanical polishing (CMP) of integrated circuit microchips to form an environmentally clean wastewater discharge.

12 Claims, 1 Drawing Sheet

U.S. PATENT DOCUMENTS

| | | | |
|---|---|---|---|
| 4,666,683 | 5/1987 | Brown et al. | 423/24 |
| 5,045,213 * | 9/1991 | Bowers | 210/726 |
| 5,225,087 | 7/1993 | Kardos | 210/713 |
| 5,256,187 | 10/1993 | Gefvert | 75/717 |
| 5,298,168 | 3/1994 | Guess | 210/713 |
| 5,346,627 | 9/1994 | Marquis et al. | 423/22 |
| 5,348,724 * | 9/1994 | Hagimori et al. | 210/763 |
| 5,464,605 | 11/1995 | Hayden | 423/579 |
| 5,476,883 | 12/1995 | Abe et al. | 523/310 |
| 5,558,775 * | 9/1996 | Busch | 210/666 |
| 5,599,515 | 2/1997 | Misra et al. | 423/101 |
| 5,616,790 | 4/1997 | Arnold et al. | 562/444 |

* cited by examiner

REMOVING METAL IONS FROM WASTEWATER

BACKGROUND OF THE INVENTION

1. Technical Field

This invention relates to a process and apparatus for removing metal ions from wastewater. In one aspect, this invention relates to a process and apparatus for removing copper ions from wastewater from a chemical mechanical polishing (CMP) of integrated circuit microchips.

2. Background

Semiconductor microelectronic chip (microchip) manufacturing companies have developed advanced manufacturing processes to shrink electronic circuitry on a microchip to smaller dimensions. The smaller circuitry dimensions involve smaller individual minimum feature sizes or minimum line widths on a single microchip. The smaller minimum feature sizes or minimum line widths, typically at microscopic dimensions of about 0.2–0.5 micron, provide for the fitting of more computer logic onto the microchip.

An advanced new semiconductor manufacturing technology involves the use of copper in place of aluminum and tungsten to create a copper microchip circuitry on a silicon wafer. The copper has an electrical resistance lower than aluminum, thereby providing a microchip which can operate at much faster speeds. The copper is introduced to ULSI and CMOS silicon structures and is utilized as interconnect material for vias and trenches on these silicon structures.

ULSI silicon structures are Ultra Large Scale Integration integrated circuits containing more than 50,000 gates and more than 256K memory bits. CMOS silicon structures are Complimentary Metal Oxide Semiconductor integrated circuits containing N-MOS and P-MOS transistors on the same substrate.

For fully integrated multi-level integrated circuit microchips, up to 6 levels, copper now is the preferred interconnect material.

A chemical mechanical polishing (CMP) planarization of copper metal layers is used as a part of the advanced new semiconductor manufacturing technology. The chemical mechanical polishing (CMP) planarization produces a substrate working surface for the microchip. Current technology does not etch copper effectively, so the semiconductor fabrication facility tool employs a polishing step to prepare the silicon wafer surface.

Chemical mechanical polishing (CMP) of integrated circuits today involves a planarization of semiconductor microelectronic wafers. A local planarization of the microchip operates chemically and mechanically to smooth surfaces at a microscopic level up to about 10 microns ($\mu$m). A global planarization of the microchip extends above about 10 microns ($\mu$m) and higher. The chemical mechanical polishing planarization equipment is used to remove materials prior to a subsequent precision integrated circuit manufacturing step.

The chemical mechanical polishing (CMP) planarization process involves a polishing slurry composed of an oxidant, an abrasive, complexing agents, and other additives. The polishing slurry is used with a polishing pad to remove excess copper from the wafer. Silicon, copper, and various trace metals are removed from the silicon structure via a chemical/mechanical slurry. The chemical/mechanical slurry is introduced to the silicon wafer on a planarization table in conjunction with polishing pads. Oxidizing agents and etching solutions are introduced to control the removal of material. Deionized water rinses often are employed to remove debris from the wafer. Ultrapure water (UPW) from reverse osmosis (RO) and demineralized water also can be used in the semiconductor fabrication facility tool to rinse the silicon wafer.

INTRODUCTION TO THE INVENTION

The chemical mechanical polishing (CMP) planarization process introduces copper into the process water, and governmental regulatory agencies are writing regulations for the discharge of wastewater from the chemical mechanical polishing (CMP) planarization process as stringently as the wastewater from an electroplating process, even though CMP planarization is not an electroplating process.

The copper ions in solution in the wastewater must be removed from the byproduct polishing slurry for acceptable wastewater disposal.

The chemical mechanical polishing planarization of the microchip produces a byproduct "grinding" (polishing) slurry wastewater which contains copper ions at a level of about 1–100 mg/l. The byproduct polishing slurry wastewater from the planarization of the microchip also contains solids sized at about 0.01–1.0 $\mu$m at a level of about 500–2000 mg/l (500–2000 ppm).

An oxidizer of hydrogen peroxide ($H_2O_2$) typically is used to help dissolve the copper from the microchip. Accordingly, hydrogen peroxide ($H_2O_2$) at a level of about 300 ppm and higher also can be present in the byproduct polishing slurry wastewater.

A chelating agent such as citric acid or ammonia also can be present in the byproduct polishing slurry to facilitate keeping the copper in solution.

A chemical/mechanical slurry wastewater will discharge from the chemical mechanical polishing (CMP) tool at a flow rate of approximately 10 gpm, including rinse streams. This chemical/mechanical slurry wastewater will contain dissolved copper at a concentration of about 1–100 mg/l.

Fabrication facilities operating multiple tools will typically generate a sufficient quantity of copper to be an environmental concern when discharged to the fabrication facility's outfall. A treatment program is needed to control the discharge of copper present in the copper CMP wastewater prior to introduction to the fabrication facility's wastewater treatment system.

A conventional wastewater treatment system at a semiconductor fabrication facility often features pH neutralization and fluoride treatment. An "end-of-pipe" treatment system typically does not contain equipment for removal of heavy metals such as copper. An apparatus and method for providing a point source treatment for copper removal would resolve a need to install a costly end-of-pipe copper treatment system.

Considering equipment logistics as well as waste solution characteristics, a point source copper treatment unit is needed which is compact and which can satisfy the discharge requirements of a single copper CMP tool or a cluster of copper CMP tools.

Iron sulfate ($FeSO_4$) or aluminum sulfate ($Al_2(SO_4)_3$) can be used to co-precipitate copper ions and produce a sludge. This precipitation process raises the pH to precipitate iron hydroxide and copper hydroxide with a remainder of a silica, alumina wastewater slurry.

The byproduct polishing slurry wastewater containing copper ions from the CMP of semiconductor microelectronic chips containing copper can be passed through a microfilter to remove solids in the form of a silica, alumina wastewater slurry.

Medford et al., U.S. Pat. No. 3,301,542, disclose treating copper contaminated acidic etching solutions from the manufacture of printed circuit boards. The acidic etching solutions wastewater is neutralized with sodium hydroxide.

Leach et al., U.S. Pat. No. 4,010,099, disclose extracting copper by contacting with an organic liquid ion exchange reagent.

Stephens, U.S. Pat. Nos. 3,912,801, and Marquis et al, 5,348,712, disclose extracting metals with cyclic organic carbonates.

Spinney, U.S. Pat. Nos. 3,440,036; Swanson, 3,428,449; and Dalton, 4,231,888, disclose extracting copper using organic oximes as the extraction agent.

The permeate from the microfilter containing permeate copper ions can be reacted with sodium sulfide ($NaS_2$) or an organic precipitating solution of a dithiocarbamate to precipitate the copper.

The dithiocarbamate precipitating solution is used to pull the copper ions away from the complexing agent.

Siefert et al., U.S. Pat. No. 5,346,627, disclose a method for removing metals from a fluid stream with a water soluble ethylene dichloride ammonia polymer that contains dithiocarbamate salt groups to form complexes with the metals.

If hydrogen peroxide ($H_2O_2$) is present, the dithiocarbamate reacts with the hydrogen peroxide ($H_2O_2$) before the dithiocarbamate operates to pull the copper ions from the complexing agent. Accordingly, hydrogen peroxide present in the precipitating step makes it difficult to precipitate the copper, and a large amount of the dithiocarbamate organic precipitating solution is required to be used.

Misra et al., U.S. Pat. No. 5,599,515, disclose treating heavy metal ion-containing wastewaters generated by printed circuit board manufacturing (Col. 1, line 20; Col. 14, lines 40–42) and removing copper ions from wastewater with a dithiocarbamate to precipitate the copper in wastewater. Misra et al. disclose that several compounds can be used to form insoluble metal complexes with heavy metal ions. All exert a stronger attraction to the metal ion than the chelants normally occurring with the metals in the wastewaters. Such complexing agents include dithiocarbamates. These complexing agents are disclosed as quite expensive. (Col. 3, lines 33–48.) Ferrous sulphate is disclosed to replace toxic heavy metal ions that are bonded by chelating agents, but large amounts of ferrous ions can be required, which produces significant quantities of sludge. (Col. 4, lines 16–49.) The Misra et al. Example V discloses the influence exerted by chelating agents and ammonium ions on a 200 mg/L copper solution. Hydrogen peroxide is added as a strong oxidizer. (Col. 12, lines 37–41.)

Guess, U.S. Pat. No. 5,298,168, discloses removing copper ions using dithiocarbamate to precipitate the copper from wastewater that has been filtered through carbon. Mercury is precipitated by dithiocarbamates. (Col. 4, lines 30–50.) Activated carbon is disclosed. (Col. 4, lines 58–59.) The Guess patent discloses that heavy metals present in the solution, such as copper, compete with mercury for the carbamate in forming a stable complex for precipitation. (Col. 7, lines 1–8.)

Kennedy, Jr., U.S. Pat. No. 4,629,570, discloses cleaning wastewater (boiler scale) using dithiocarbamate as a copper precipitate and carbon filtration. In the Kennedy, Jr. U.S. Pat. No. 4,629,570, chelated copper is removed by dithiocarbamates added in stoichiometric amounts to the amount of dissolved copper. (Col. 3, lines 18–26.) Activated charcoal then can be used. (Col. 3, lines 27–30.)

Asano et al., U.S. Pat. No. 3,923,741, in Example 3 pass a copper solution through a granular active carbon column. Flow resistance is measured and reported. The solution then is passed through an ion exchange resin column. (U.S. Pat. No. 3,923,741, Col. 6, lines 35–65.)

Koehler et al., U.S. Pat. No. 3,914,374, disclose removing residual copper from acid nickel solutions by activated carbon which absorbs the copper.

Hayden, U.S. Pat. No. 5,464,605, discloses removing peroxides from liquids by activated carbon.

Conventional pretreatment practice for granular activated carbon beds principally requires the removal of contaminants such as excess amounts of suspended solids. Suspended solids, including bacteria, in amounts exceeding about 50 mg/l are required to be removed prior to operating the carbon bed.

Wastewaters from non-copper CMP processes are generally discharged to the semiconductor fabrication facility end-of-pipe where the wastewater is neutralized prior to discharge. With the advent of copper technology, these slurry wastewaters will contain copper.

Copper present in the fabrication facility outfall can pose problems. Some fabrication facilities must control the amount of suspended solids in the out fall. Accumulation in the receiving POTW's (Publicly Owned Treatment Works) sludges result in increased cost for municipal sludge disposal and environmental concerns to eliminate copper in the municipal sludge.

Bio-toxicity problems in the municipal biological systems are caused by mass loading of copper.

Environmental discharge limits for copper result in non-compliance at the fabrication facility.

A process and apparatus are needed to remove the copper from the waste slurries near the point of generation and permit a copper-free waste to pass to discharge and neutralization in the conventional manor.

A process and apparatus are needed to remove copper ions from solution for acceptable wastewater disposal of byproduct polishing slurries containing high amounts of suspended solids and to remove the copper ions from solution containing high amounts of suspended solids efficiently and economically.

It is an object of the present invention to provide a novel process and apparatus for removing metal ions from solution.

It is an object of the present invention to provide a novel process and apparatus for removing metal ions from solutions containing high amounts of suspended solids.

It is an object of the present invention to provide a novel process and apparatus for removing copper ions from solution.

It is an object of the present invention to provide a novel process and apparatus for removing copper ions from solutions containing high amounts of suspended solids.

It is an object of the present invention to provide a novel process and apparatus for removing copper ions from solution from a byproduct polishing slurry for acceptable wastewater disposal.

Another object of the present invention is to provide a novel process and apparatus for removing copper ions from solution from a byproduct polishing slurry from the chemical mechanical polishing (CMP) of integrated circuits.

It is a further object of the present invention to provide a novel process and apparatus for removing copper ions from solutions containing high amounts of suspended solids economically and efficiently.

These and other objects and advantages of the present invention will become more apparent to those skilled in the art in view of the following detailed description and the accompanying drawing.

SUMMARY OF THE INVENTION

The process and apparatus of the present invention remove metal ions from wastewater by providing a first step carbon adsorption bed for receiving a wastewater feed containing metal ions in solution, wherein the wastewater feed contains solids sized in the range of about 0.01–1.0 $\mu$m in an amount higher than about 50 mg/l, in combination with providing a second step chemical precipitation unit operation for receiving a carbon bed product stream from the carbon adsorption bed and for removing the metal ions from solution. The process and apparatus of the present invention remove metal ions from wastewater containing solids in an amount higher than about 100 mg/l, preferably in an amount higher than about 500 mg/l, e.g., by way of example in an amount in the range of about 500–2000 mg/l.

A wastewater feed containing hydrogen peroxide and metal ions in solution is passed to the carbon column to reduce the concentration of the hydrogen peroxide and form a carbon bed effluent having concentration levels of hydrogen peroxide less than about 1 mg/l (1 ppm). In one aspect, the metal ions are copper ions. In one aspect, the metal ions are copper ions at a concentration level in the range of about 1–100 mg/l.

The chemical precipitation unit operation includes means for contacting copper ions in the carbon bed product stream metal ions with an organic carbamate to precipitate the copper ions. In one embodiment, the organic carbamate includes dithiocarbamate.

In an alternative embodiment, the chemical precipitation unit operation includes means for contacting copper ions in the carbon bed product stream with an inorganic iron sulfate ($FeSO_4$) or aluminum sulfate ($Al_2(SO_4)_3$) to co-precipitate the copper ions at a neutral or elevated pH.

The process and apparatus of the present invention operate to remove metal ions from a wastewater from a byproduct polishing slurry. In one embodiment, the process and apparatus of the present invention operate to remove metal ions, e.g., such as copper metal ions, from a wastewater from a byproduct polishing slurry from the chemical mechanical polishing (CMP) of integrated circuit microchips to precipitate the metal ions and form an environmentally clean water discharge product.

BRIEF DESCRIPTION OF THE DRAWINGS

The sole FIGURE is a process schematic diagram of the process and apparatus of the present invention.

DETAILED DESCRIPTION

Figure 1:
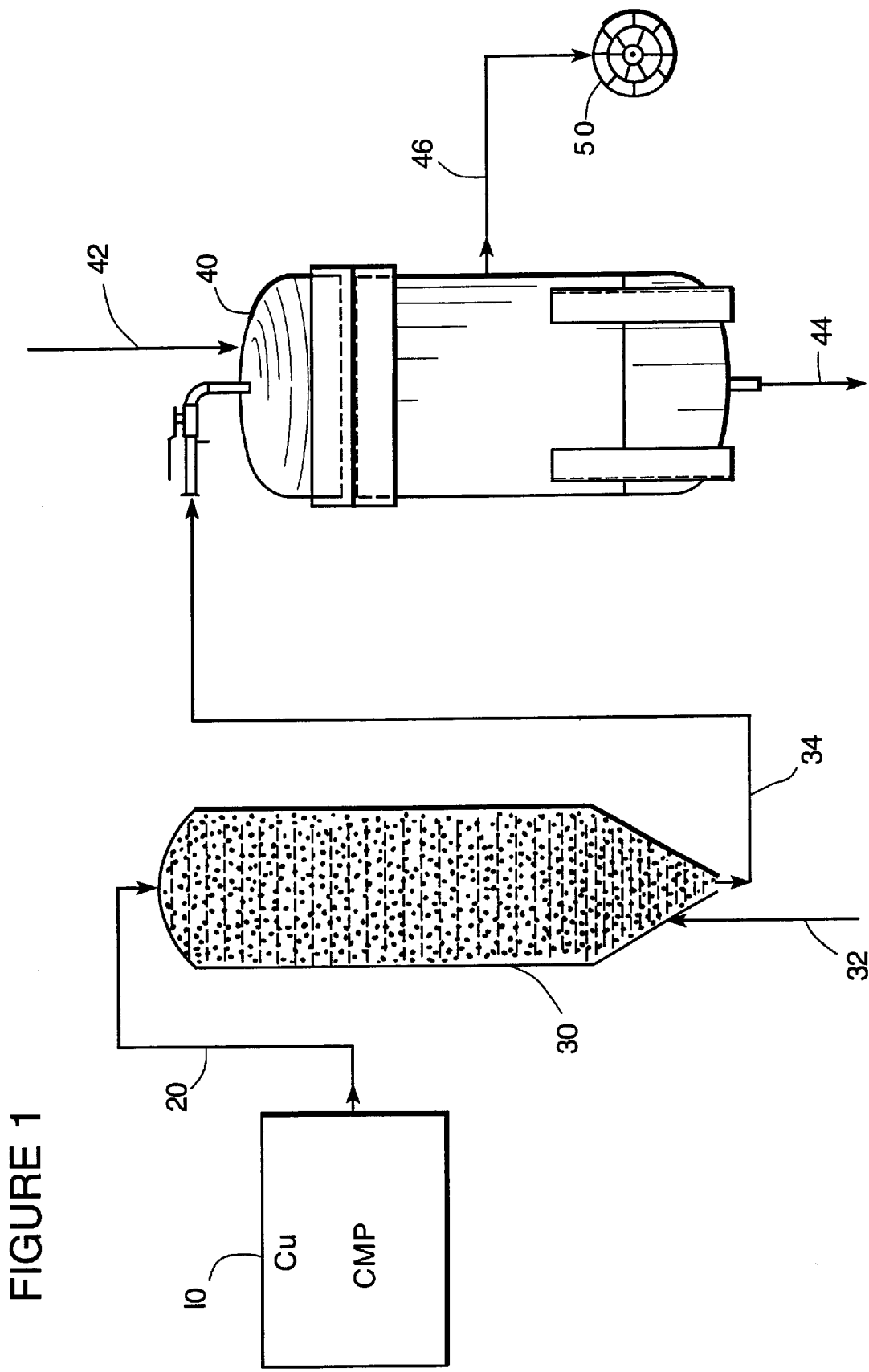

The process and apparatus of the present invention provide for a removal of metal ions through a combination of steps including passing a wastewater solution containing metal ions first through a carbon adsorption column, preferably without prior micro-filtration or ultra-filtration removal of suspended solids, to remove hydrogen peroxide ($H_2O_2$) catalytically and then reacting the wastewater solution containing metal ions with an organic precipitating solution to remove the metal ions from solution.

Solids are defined herein using Standard Methods 302 A, Preliminary Filtration for Metals (1985, 16th ed.).

In an alternative embodiment, the wastewater solution containing metal ions passing from the carbon column can be reacted with an inorganic precipitating solution to remove the metal ions from solution.

In one aspect, the process and apparatus of the present invention provide a novel process and apparatus for the removal of copper ions including passing a wastewater solution containing copper ions first through a carbon column, preferably without prior micro-filtration or ultra-filtration removal of silica, alumina slurry solids, to remove the hydrogen peroxide ($H_2O_2$) catalytically and then reacting the wastewater solution containing copper ions with an organic dithiocarbamate to precipitate the copper.

In one aspect, the process and apparatus of the present invention provide a novel apparatus and process for the removal of copper ions including passing a wastewater solution containing copper ions first through a carbon adsorption column, preferably without prior micro-filtration/removal of silica, alumina slurry solids, to remove catalytically the hydrogen peroxide ($H_2O_2$) and then reacting the wastewater solution containing copper ions with an inorganic ferrous sulfate or aluminum sulfate to precipitate the copper.

The process and apparatus of the present invention provide a novel process and apparatus for the removal of copper ions from a byproduct polishing slurry wastewater solution containing copper from the chemical mechanical polishing (CMP) of integrated circuits of semiconductor microelectronic chips.

Referring now to the FIGURE, a process schematic diagram shows the metal ion removal process and apparatus of the present invention. A chemical mechanical polishing (CMP) planarization tool 10, e.g., such as in an integrated circuit microchip fabrication facility, discharges a wastewater stream 20 containing metal ions in solution, e.g., such as copper ions in solution. The wastewater stream 20 containing copper ions also contains hydrogen peroxide at levels up to about 300 ppm and higher. The hydrogen peroxide is used as an oxidizer to help dissolve the copper from the microchip. The wastewater stream 20 containing copper ions and hydrogen peroxide also contains suspended solids, e.g., such as silica, alumina slurry solids, at nominal particle diameter sizes of about 0.01–1.0 $\mu$m and at concentration levels above about 50 mg/l (50 ppm), e.g, such as by way of example, in the range of about 500–2000 mg/l (500–2000 ppm)

The wastewater stream 20 is passed to a carbon column 30. The carbon column 30 contains granular activated carbon particles sized in the range of about 8×40 mesh. A suitable carbon is 8×30 mesh acid washed available from U.S. Filter Westates Carbon—Arizona Inc. in Parker, Ariz. The hydrogen peroxide of the wastewater stream 20 passes down-flow in the carbon column 30 and is adsorbed onto the granular activated carbon in the carbon column 30. A back-flow stream 32 provides for rinse and regeneration of carbon column 30.

A product stream 34 from the carbon column 30 containing copper ions in solution and grinding (polishing) solids from the carbon column 30 is passed to a chemical unit operation 40. A chemical feed stream 42 passes a chemical feed, e.g., such as an organic dithiocarbamate to chemical unit operation 40 for precipitation and removal of the copper ions. Precipitated copper and some slurry solids may be removed through discharge 44. Environmentally clean wastewater slurry passes through wastewater discharge 46 to a municipal drain 50.

Copper CMP wastewater contains oxidizers, dissolved copper, copper etchants, alumina particles, silica particles and sometimes a corrosion inhibitor. These constituents are contained in a background of deionized water. The following constituent concentrations are common.

| | | |
|---|---|---|
| Dissolved copper | -- | 5.0 mg/l |
| Total suspended solids | -- | 1000.0 mg/l |
| Oxidizing agents | -- | 300.0 mg/l |
| Etchants | -- | 200.0 mg/l |
| Complexing agents | -- | 400.0 mg/l |
| DI water background | -- | 99%+ |
| TDS | -- | 800 |
| pH | -- | 6 to 7 |

Oxidizers such as nitric acid, hydrogen peroxide, ferric nitrate, and ammonium persulfate are chemicals for enhancing the copper corrosion rate of a slurry. Other complexing agents such as citric acid or ammonium hydroxide help to etch the copper.

A multiple copper CMP tool cluster generates about 100 gpm of wastewater. The wastewater can be fed by gravity to an influent collection tank having a retention time, e.g., of about 10 minutes. The collected CMP wastewater can be pressurized in a lift station prior to feeding to the process and apparatus of the present invention.

Prior to an actual reduction to practice, it was thought that the silica, alumina slurry solids would foul the bed and plug the carbon column in a matter of hours.

However, it has been found that the process and apparatus of the present invention operate unexpectedly without fouling and have been observed to run for 10 days and more with no pressure increase and no plugging. The hydrogen peroxide ($H_2O_2$) is decomposed catalytically in the carbon column. Significantly less dithiocarbamate organic precipitating solution is required to precipitate the copper.

The process and apparatus of the present invention remove hydrogen peroxide ($H_2O_2$) and dissolved copper ions from a byproduct "grinding" (polishing) slurry wastewater from the metal chemical mechanical polishing (CMP) of integrated circuits, including high speed semiconductor integrated circuit microelectronic chips containing copper metal.

EXAMPLE

A treatability study was conducted on a series of grinding wastes from a variety of chemical mechanical polishing (CMP) operations for producing integrated circuit semiconductor microelectronic chips. Treatments were performed on the CMP grinding wastes received from various integrated circuit semiconductor microchip manufacturers. Treatments were performed on the CMP grinding wastes to investigate and determine copper removal from an alumina slurry.

A novel method and apparatus provided a first step carbon adsorption removal of hydrogen peroxide from a wafer CMP planarization grinding waste combined with a second step chemical precipitation of complexed copper in the wafer planarization grinding waste. The wafer planarization grinding waste contained many particulate alumina solids which otherwise, i.e., if not for the copper, could be disposed via a municipal drain or sewer.

Samples used during this Example were CMP wastes associated with computer microchip manufacturing. Several samples were used in the testing.

Table 1 lists the samples.

TABLE 1

| Samples Received | |
|---|---|
| Source | Label |
| A | CMP Waste |
| B | CMP Waste |
| C | CMP Waste |

The carbon used during all carbon column testing was Calgon RX 8×40 mesh (Lot 04033) available from Calgon Carbon Co. in Pittsburgh, Pa. A suitable equivalent carbon is 8×30 mesh acid washed available from U.S. Filter Westates Carbon—Arizona Inc in Parker Ariz. The carbon was prepared by degassing and rinsing. Prior to the experimental, the carbon was conditioned by mixing in deionized water for ten minutes to allow for degassing and cleaning. The carbon was allowed to settle, and the suspended fines were decanted off with the supernatant. This conditioning was repeated until the supernatant was clear and colorless with no visible suspensions.

For column loading, the conditioned carbon was slurried and poured into a Plexiglas column having dimensions of about 1 inch diameter and 60 inches height. The final bed depth of the carbon was 36 inches. Deionized water was put through the column counter-currently to classify the carbon and remove any residual carbon dust.

Three samples were put through the carbon column, "A," "B," and "C," representing different manufacturing companies and separate facilities. One of the samples used during this test was "A" slurry previously concentrated using a Membralox Silverback® microfilter purification system available commercially from U.S. Filter Wastewater Systems, Inc. in Warrendale, Pa. The concentrate was re-diluted with deionized water to simulate as-received characteristics.

Hydrogen peroxide was added to all of the slurry samples to accurately simulate expected concentrations of about 400 mg/l (400 ppm) total.

The CMP slurry solutions containing hydrogen peroxide were passed through the carbon filter bed without prior removal of any of the alumina, silica particles in the CMP slurry solutions. During this stage of experimental, an influent pressure and a hydrogen peroxide content were monitored.

A peristaltic pump was used to transfer the sample from a 55 gallon drum into the carbon column. The flow rate was monitored to be consistent throughout the experimental testing.

During the course of the experimental testing operation, it was noted that gas bubbles would be forced out through the bottom effluent tube column rather than gassing up through the top of the carbon bed. This was consistent throughout the experimental testing.

Early in the experimental, the flow was stopped overnight. Several times the upper portion of the carbon bed would be dry. Retaining a higher liquid head space prior to shutting of the pump eliminated this undesired condition. It is believed that gassing continued while stationary, and subsequently the liquid volume would fall.

After an initial period of time, an ammonium citrate/copper solution was added to the slurry.

Table 2 summarizes the results of the carbon column testing.

TABLE 2

Carbon Column Testing

| Bed Volumes | Inlet Pressure | Feed H2O2 | Effluent H2O2 | Influent Cu | Effluent Cu |
|---|---|---|---|---|---|
| 8 | <1 | — | — | <1 | — |
| 40 | <1 | 428 | <1 | <1 | — |
| 50 | <2 | — | <1 | <1 | — |
| 80 | 2.75 | 420 | <1 | <1 | — |
| 115 | 2.2 | — | <1 | <1 | — |
| 123 | <2 | — | <1 | <1 | — |
| 164 | 2.2 | — | <1 | <1 | — |
| Citric Acid/Copper added | | | | | |
| 172 | <2 | — | <1 | 6.9 | — |
| 204 | <2 | — | <1 | — | 0.35 |
| 212 | <2 | — | — | — | — |
| 370 | <2 | — | <1 | — | — |
| 520 | <2 | 412 | — | — | 5.16 |
| New feed ("A" slurry + H2O2 + Cu) | | 400 | | | |
| 529 | <2 | — | <1 | — | — |
| 544 | <2 | — | <1 | — | — |
| 592 | <2 | — | <1 | — | 7.4 |
| 650 | <2 | — | <1 | — | 7.6 |
| 663 | <2 | — | <1 | — | — |
| 694 | <2 | — | <1 | — | 7.1 |
| 710 | <2 | — | <1 | — | — |
| 726 | <2 | — | — | — | — |
| 742 | <2 | — | <1 | — | — |
| 758 | <2 | — | — | — | — |
| 766 | <2 | — | — | — | — |
| 774 | <2 | — | <1 | — | — |
| 790 | <2 | — | — | — | — |
| 806 | <2 | — | — | — | — |
| 822 | <2 | — | <1 | — | — |
| 838 | <2 | — | — | — | — |
| 864 | <2 | — | — | — | — |
| 880 | <2 | — | <1 | — | — |
| 896 | <2 | — | <1 | — | — |
| 912 | <2 | — | — | — | — |
| 936 | <2 | — | <1 | — | — |
| 944 | <2 | — | <1 | — | — |
| 952 | <2 | — | — | — | — |
| 968 | <2 | — | <1 | — | — |
| 984 | <2 | — | — | — | — |
| 1000 | <2 | — | <1 | — | — |

The results of Table 2 showed that carbon could remove hydrogen peroxide from CMP slurry solutions without entrapping the alumina, silica particles within the filter bed.

The novel process and apparatus of the present invention have applications to the precipitation and removal of metal ions other than copper from chemical planarization wastewater solutions. The novel process and apparatus of the present invention have applications to the precipitation and removal of metal ions such as copper, gold, platinum, palladium, iron, cobalt, nickel, ruthenium, rhodium, silver, osmium, iridium, and mixtures thereof. Preferred embodiments of the process and apparatus of the present invention have applications to the precipitation and removal of metal ions such as copper and gold.

The process and apparatus of the present invention remove metal ions from wastewater by providing a carbon bed for receiving a wastewater feed containing metal ions in solution, wherein the wastewater feed contains solids sized in the range of about 0.01–1.0 μm in an amount higher than about 100 mg/l, in combination with providing a chemical precipitation unit operation for receiving a carbon bed product stream from the carbon bed and for removing the metal ions from solution. The process and apparatus of the present invention remove metal ions from wastewater containing solids in an amount higher than about 500 mg/l, e.g., by way of example in an amount in the range of about 500–2000 mg/l.

A wastewater feed containing hydrogen peroxide and metal ions in solution is passed to the carbon column to reduce the concentration of the hydrogen peroxide and form a carbon bed effluent having concentration levels of hydrogen peroxide, preferably to a level less than about 1 mg/l (1 ppm). In one aspect, the metal ions are copper ions. In one aspect, the metal ions are copper ions at a concentration level in the range of about 1–100 mg/l.

The chemical precipitation unit operation includes means for contacting metal ions in the carbon bed product stream with an organic carbamate to precipitate the copper ions. In one embodiment, the organic carbamate includes dithiocarbamate.

In an alternative embodiment, the chemical precipitation unit operation includes means for contacting metal ions in the carbon bed product stream with an inorganic iron sulfate (FeSO$_4$) or aluminum sulfate (Al$_2$(SO$_4$)$_3$) to precipitate the copper ions.

The process and apparatus of the present invention operate to remove metal ions from a wastewater from a byproduct polishing slurry. In one embodiment, the process and apparatus of the present invention operate to remove metal ions, e.g., such as copper metal ions, from a wastewater from a byproduct polishing slurry from the chemical mechanical polishing (CMP) of integrated circuits to precipitate the metal ions and form an environmentally clean water discharge product. By environmentally clean is meant a wastewater discharge stream to a municipal wastewater treatment plant such that the wastewater discharge stream contains copper ions in a concentration less than about 0.5 mg/l (0.5 ppm).

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

What is claimed is:

1. A process for removing metal ions from wastewater, comprising:
   (a) passing a wastewater feed containing hydrogen peroxide and metal ions in solution through a carbon bed, wherein said wastewater feed contains solids sized in the range of about 0.01–1.0 μm in an amount higher than about 50 mg/l to form a carbon bed product stream; and
   (b) passing said carbon bed product stream from said carbon bed to a chemical precipitation unit for removing said metal ions from solution.

2. The process for removing metal ions from wastewater as set forth in claim 1, wherein said wastewater feed contains solids in an amount higher than about 100 mg/l.

3. The process for removing metal ions from wastewater as set forth in claim 1, wherein said wastewater feed contains solids in an amount in the range of about 500–2000 mg/l.

4. The process for removing metal ions from wastewater as set forth in claim 1, wherein said passing said wastewater feed containing hydrogen peroxide and metal ions in solution to said carbon bed reduces the concentration of said hydrogen peroxide and forms a carbon bed effluent having concentration levels of hydrogen peroxide less than about 1 mg/l.

5. The process for removing metal ions from wastewater as set forth in claim 4, wherein said metal ions comprise copper ions.

6. The process for removing metal ions from wastewater as set forth in claim 5, wherein said wastewater feed contains copper ions at a level in the range of about 1–100 mg/l.

7. The process for removing metal ions from wastewater as set forth in claim 5, wherein said step of passing said carbon bed product stream from said carbon bed to a chemical precipitation unit comprises contacting metal ions in said carbon bed product stream with an organic carbamate to precipitate said copper ions.

8. The process for removing metal ions from wastewater as set forth in claim 5, wherein said step of passing said carbon bed product stream from said carbon bed to a chemical precipitation unit comprises contacting said carbon bed product stream metal ions with dithiocarbamate to precipitate said copper ions.

9. The process for removing metal ions from wastewater as set forth in claim 8, wherein said step of passing said carbon bed product stream from said carbon bed to a chemical precipitation unit comprises contacting said carbon bed product stream metal ions with iron sulfate or aluminum sulfate to co-precipitate said copper ions.

10. The process for removing metal ions from wastewater as set forth in claim 5, wherein said wastewater feed comprises a byproduct polishing slurry.

11. The process for removing metal ions from wastewater as set forth in claim 10, wherein said wastewater feed comprises a byproduct polishing slurry from the chemical mechanical polishing of integrated circuit microchips.

12. A process for removing copper ions in a byproduct polishing slurry wastewater from the chemical mechanical polishing of integrated circuit microchips, comprising:

(a) providing a carbon bed for receiving a byproduct polishing slurry wastewater feed from the chemical mechanical polishing of integrated circuits;

(b) providing a chemical precipitation unit for receiving a carbon bed product stream from said carbon bed and for removing said copper ions from solution;

(c) passing a byproduct polishing slurry wastewater feed containing copper ions in solution at a level in the range of about 1–100 mg/l and further containing hydrogen peroxide and solids sized in the range of about 0.01–1.0 μm in an amount higher than about 500 mg/l from the chemical mechanical polishing of integrated circuit microchips to said carbon bed, to reduce the concentration of said hydrogen peroxide and form a carbon bed effluent product stream having concentration levels of hydrogen peroxide less than about 1 mg/l, wherein said byproduct polishing slurry wastewater feed further contains solids sized in the range of about 0.01–1.0 μm in an amount higher than about 500 mg/l; and (d) contacting copper ions in said carbon bed effluent product stream with an organic carbamate in said chemical precipitation unit to precipitate said copper ions and form an environmentally clean water discharge product.

* * * * *

UNITED STATES PATENT AND TRADEMARK OFFICE
CERTIFICATE OF CORRECTION

PATENT NO. : 6,315,906 B1
DATED : November 13, 2001
INVENTOR(S) : Sassaman, Jr. et al.

It is certified that error appears in the above-identified patent and that said Letters Patent is hereby corrected as shown below:

Column 3,
Lines 3, 7, 23, 35, 54, 63, 65 and 66, change "U.S. Pat. No." to -- U.S. Patent --.
Lines 10 and 14, change "U.S. Pat Nos." to -- U.S. Patent --.
Line 14, change "Swanson, 3,428,449;" to -- Swanson, U.S. Patent 3,428,449; --.
Line 15, change "Dalton, 4,231,888," to -- Dalton, U.S. Patent 4,231,888, --.

Column 4,
Lines 3, 8 and 12, change "U.S. Pat. No." to -- U.S. Patent --.
Lines 6 and 7, change "U.S. Pat. No." to -- U.S. --.

Column 6,
Line 47, change "(500-2000 ppm)" to -- (500-2000 ppm). --.

Column 8,
Lines 14 and 36, change "Pa" to -- Pennsylvania --.
Line 16, change "Ariz." to -- Arizona --.
Line 37, change "simulate as-recieved characteristics" to -- simulate "as-received characteristics" --.

Column 11,
Line 21, change "claim 8," to -- claim 5, --.

Signed and Sealed this

First Day of April, 2003

JAMES E. ROGAN
*Director of the United States Patent and Trademark Office*